United States Patent
Kim et al.

(10) Patent No.: US 8,111,153 B2
(45) Date of Patent: Feb. 7, 2012

(54) APPARATUS AND METHOD FOR PROVIDING POSITION INFORMATION AND GATHERING INFORMATION USING RFID

(75) Inventors: Min-Soo Kim, Daejon (KR); Eun-Kyu Lee, Gyeonggi-do (KR); Yong-Joon Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 360 days.

(21) Appl. No.: 12/447,774

(22) PCT Filed: Oct. 12, 2007

(86) PCT No.: PCT/KR2007/004993
§ 371 (c)(1),
(2), (4) Date: Apr. 29, 2009

(87) PCT Pub. No.: WO2008/054071
PCT Pub. Date: May 8, 2008

(65) Prior Publication Data
US 2010/0073154 A1    Mar. 25, 2010

(30) Foreign Application Priority Data

Oct. 30, 2006    (KR) .................. 10-2006-0105869
Dec. 8, 2006    (KR) .................. 10-2006-0124828

(51) Int. Cl.
*G08B 1/08*    (2006.01)
(52) U.S. Cl. .................. 340/539.13; 340/933; 340/922; 340/539.1
(58) Field of Classification Search ............. 340/539.13, 340/905, 933, 922, 539.1
See application file for complete search history.

(56) References Cited

U.S. PATENT DOCUMENTS

| | | | |
|---|---|---|---|
| 6,600,418 B2 | 7/2003 | Francis et al. | |
| 7,034,741 B2 | 4/2006 | Chon et al. | |
| 7,038,573 B2 | 5/2006 | Bann | |
| 2007/0032245 A1* | 2/2007 | Alapuranen | 455/456.1 |

FOREIGN PATENT DOCUMENTS

| | | |
|---|---|---|
| JP | 2002-083396 A | 3/2002 |
| JP | 2002-208088 A | 7/2002 |
| KR | 1020010068086 A | 7/2001 |
| KR | 1020040045237 A | 6/2004 |
| KR | 10-0511555 B1 | 8/2005 |
| KR | 1020050082247 A | 8/2005 |
| KR | 1020060010600 A | 2/2006 |
| KR | 10-0578250 B1 | 5/2006 |
| KR | 10-0772013 B1 | 10/2007 |

OTHER PUBLICATIONS

International Search Report: mailed Dec. 24, 2007; PCT/KR2007/004993.

* cited by examiner

*Primary Examiner* — Daryl Pope
(74) *Attorney, Agent, or Firm* — Ladas & Parry LLP

(57) ABSTRACT

Provided are an apparatus and a method for providing position information and gathering information using Radio Frequency Identification (RFID). The apparatus includes: a plurality of RFID tags, driven by a radio frequency transmitted from an RFID reader installed in the vehicle, for providing stored tag information in order to provide current position information to the vehicle; a plurality of sensor nodes for sensing the time point when the RFID tags are driven and transmitting the sensed information through a sensor network; and an information gathering server for gathering and processing the information sensed by the sensor nodes, where at least two RFID tags and one sensor node are configured in groups, and the groups are installed at predetermined intervals on each lane of a road.

14 Claims, 4 Drawing Sheets

[Fig. 1]
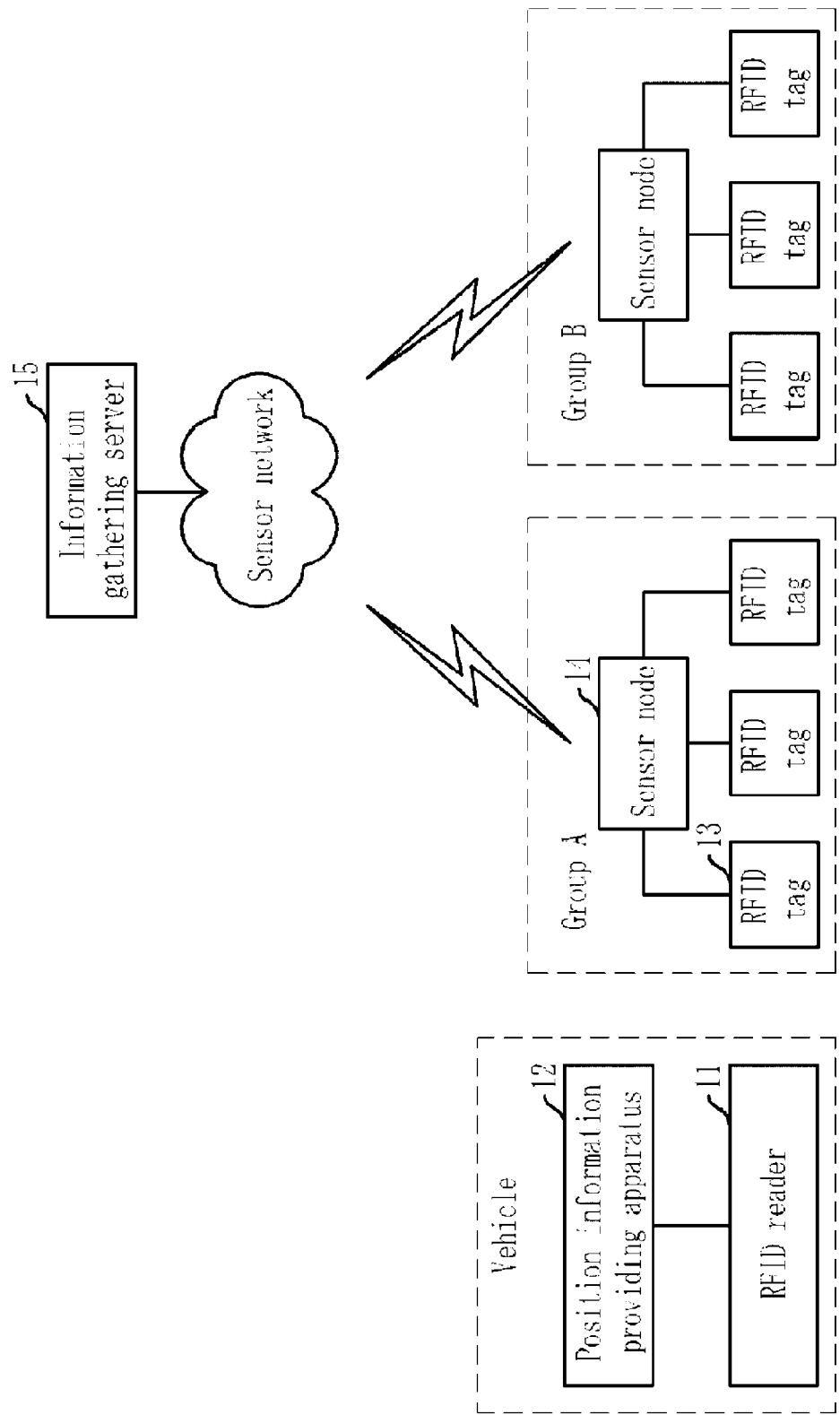

[Fig. 2]
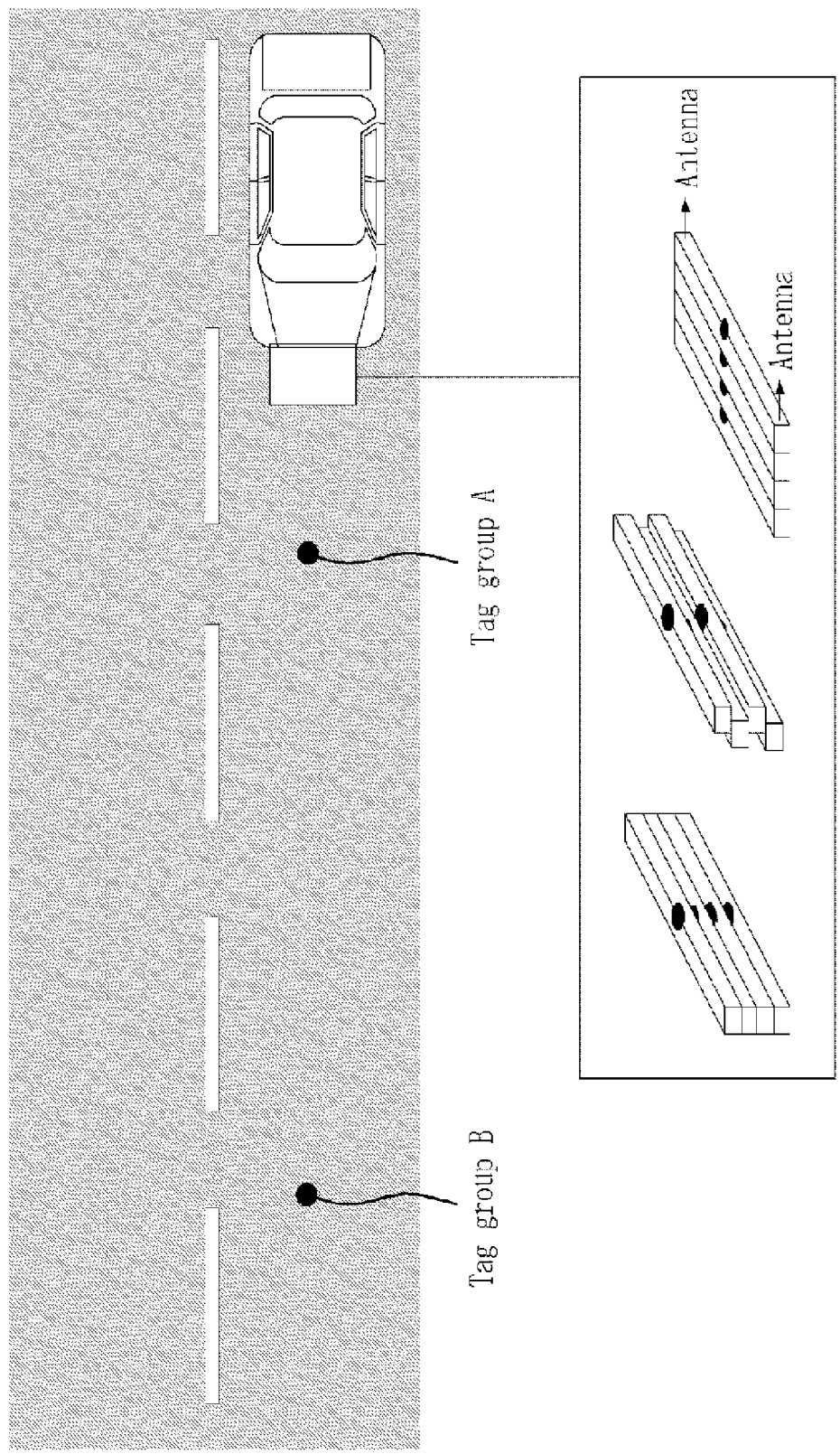

[Fig. 3]
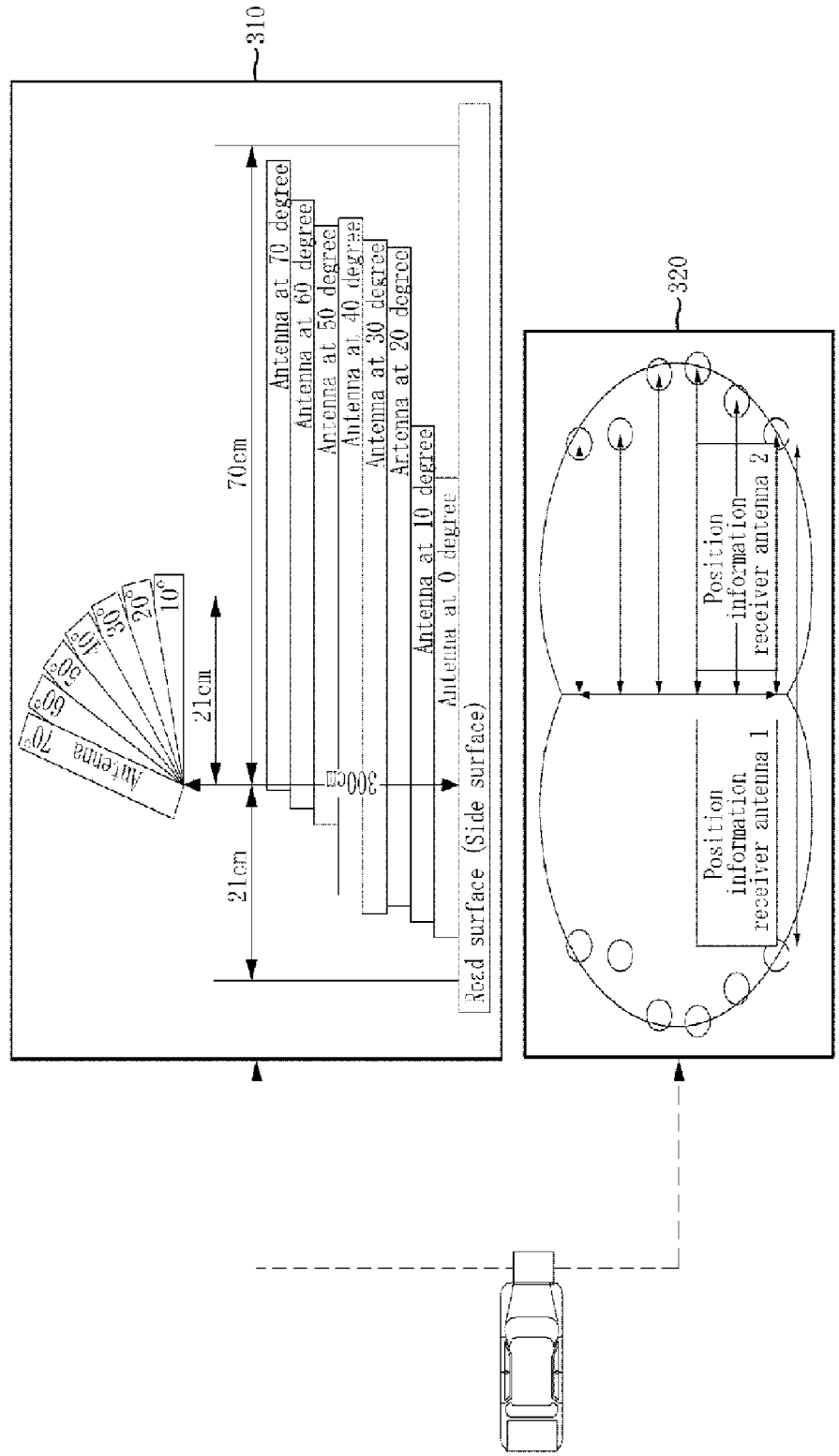

[Fig. 4]
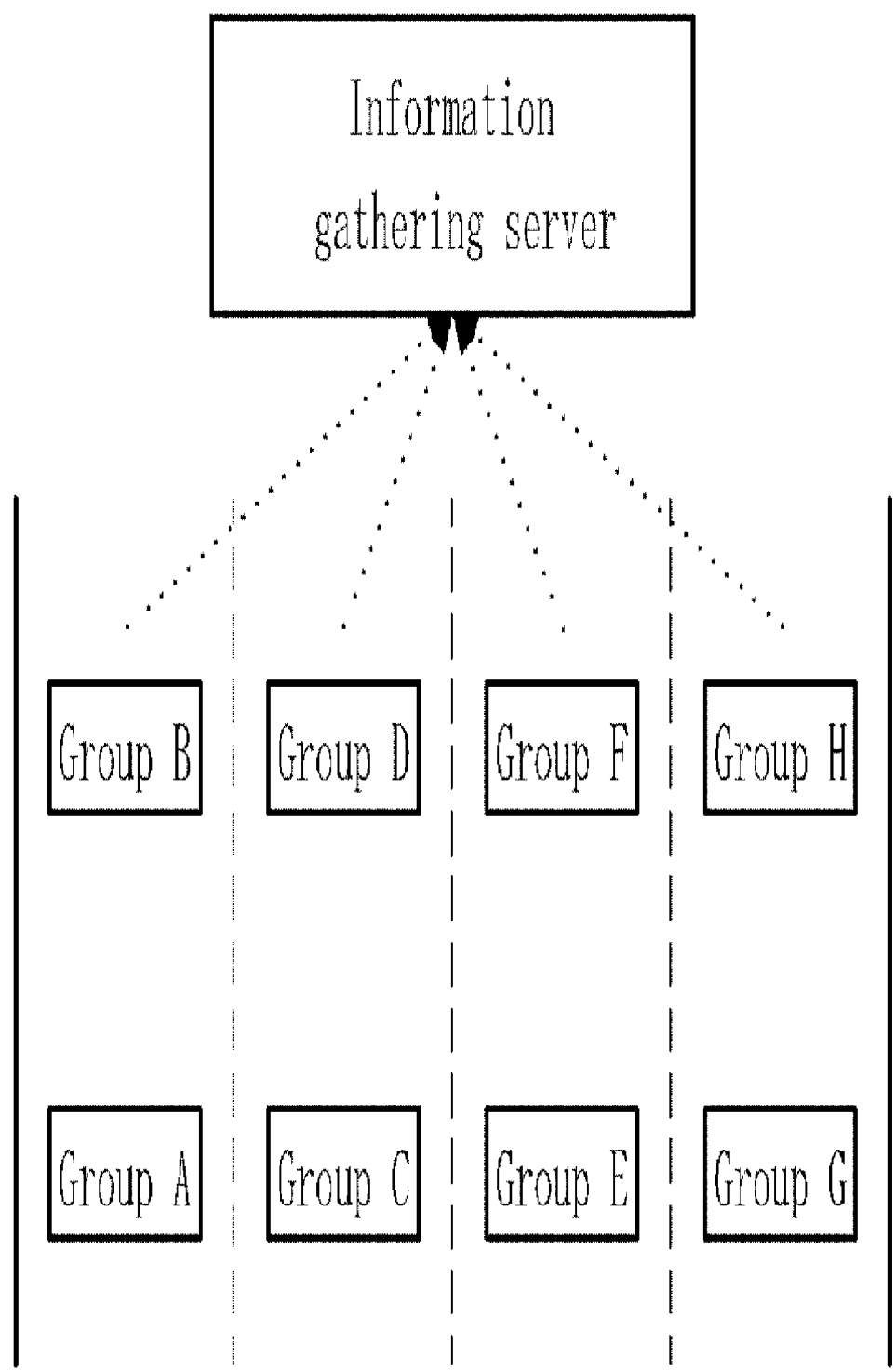

APPARATUS AND METHOD FOR PROVIDING POSITION INFORMATION AND GATHERING INFORMATION USING RFID

TECHNICAL FIELD

The present invention relates to an apparatus and a method for providing position information and gathering information using Radio Frequency Identification (RFID); and more particularly, to an apparatus and a method for providing position information and gathering information using RFID, which provides a driver with current position information of a vehicle by reading information of RFID tags installed on each lane of a road by an RFID reader installed in the vehicle, and transmits the time when the vehicle has passed to an information gathering server through a sensor network, along with the RFID tag information, by recognizing the time point at which the RFID tags operate by a sensor node, so as to analyze the intervals between vehicles on the road.

This work was supported by the Information Technology (IT) research and development program of the Korean Ministry of Information and Communication (MIC) and/or the Korean Institute for Information Technology Advancement (IITA) [2006-S022-01, "Development of USN Middleware Platform Technology"].

BACKGROUND ART

Conventional locating techniques include techniques using a base station of a mobile communication network, techniques using a Global Positioning System (GPS) receiver, and techniques using Radio Frequency Identification (RFID) information.

The locating techniques using a base station of a mobile communication network include the technique of locating a user using identification information of a base station to which a user terminal belongs and the technique of calculating the position of a user terminal using the arrival time and difference in angle of a frequency transmitted to the user terminal from three adjacent base stations.

Typically, a conventional position information providing system gathers position information of user terminals in a server providing position information, and provides a variety of additional services by using current position information of the user terminals gathered in the position information server.

The technique of locating using a base station or using a GPS receiver brings about the problems of signal attenuation, multiple paths, etc. in civic center regions where buildings are dense or in shadow regions, and thus causes the problem that position information cannot be precisely gathered.

Further, in case that position information is stored in a server, individual users have to receive their position information from the server through a radio communication link. Due to this, the users have to pay communication costs in order to receive position information.

Meanwhile, the technique of providing position information using RFID can be largely classified into the Real-Time Locating System (RTLS) technique and the technique of directly using positions held by RFID tags. The RTLS technique is a technique that utilizes RFID tags and an RFID reader. That is, the server calculates the position of the RFID reader by using a time difference or the like in communication between the RFID reader and the RFID tags. However, this RTLS technique has the problem to be solved in order to be applied to a vehicle traveling at a high speed.

Moreover, the technique of directly providing position information held by RFID tags through an RFID reader is a technique in which position information held by the RFID tags is received under the situation in which the RFID reader is installed in an object in advance, so that the position information can be utilized in the object. However, this technique has a lot of problems to be solved in order to be applied to a vehicle traveling at a high speed although it is able to provide real-time position information to a stationary object.

DISCLOSURE OF INVENTION

Technical Problem

It is, therefore, an object of the present invention to provide an apparatus and method for providing position information and gathering information using Radio Frequency Identification (RFID), which provides a driver with current position information of a vehicle by reading information of RFID tags installed on each lane of a road by an RFID reader installed in the vehicle, and transfers the time when the vehicle has passed to an information gathering server through a sensor network, along with the RFID tag information, by recognizing the time point at which the RFID tags operate by a sensor node, to thereby analyze the intervals between vehicles on the road.

Technical Solution

In accordance with an aspect of the present invention, there is provided an apparatus for providing position information to a vehicle and gathering vehicle information on each lane of a road, including: a plurality of Radio Frequency Identification (RFID) tags, driven by a radio frequency transmitted from an RFID reader installed in the vehicle, for providing stored tag information in order to provide current position information to the vehicle; a plurality of sensor nodes for sensing the time point when the RFID tags are driven and transmitting the sensed information through a sensor network; and an information gathering server for gathering and processing the information sensed by the sensor nodes, wherein at least two RFID tags and one sensor node are configured in groups, and the groups are installed at predetermined intervals on each lane of a road.

In accordance with another aspect of the present invention, there is provided a method for providing position information and gathering information in a system in which an RFID reader is installed in a vehicle and RFID tags are installed at predetermined intervals on each lane of a road, including the steps of: a) driving the RFID tags installed on the road by the RFID reader and transmitting information of the RFID tags to the RFID reader; b) sensing the driving time point of the RFID tags and transmitting sensing information along with the identifier (ID) thereof to an information gathering server through a sensor network; and c) storing and processing the sensing information gathered by the information gathering server through the sensor network.

Advantageous Effects

As mentioned above and will be described below, the present invention can provide a driver with current position information of a vehicle by reading information of Radio Frequency Identification (RFID) tags installed on each lane of a road by an RFID reader installed in the vehicle, and can transmit the time when the vehicle has passed to an information gathering server through a sensor network, along with the RFID tag information, by recognizing the time point at which the RFID tags operate by a sensor node, so as to analyze the intervals between vehicles on the road. Accordingly, the present invention allows a position information providing apparatus installed in a vehicle to receive its own position information and perform guidance on a lane change without any additional communication costs, and enables simulation such as the prediction of vehicle collision at a crossroad by gathering precise position information of the vehicle entering from each direction of the crossroad in real-time and using the gathered position information.

BRIEF DESCRIPTION OF THE DRAWINGS

FIG. 1 is a block diagram of an apparatus for providing position information and gathering information using Radio Frequency Identification (RFID) in accordance with an embodiment of the present invention.

FIG. 2 is a view illustrating an installation state of RFID tags and an RFID reader in accordance with an embodiment of the present invention.

FIG. 3 is a view describing recognition areas of the RFID reader in accordance with an embodiment of the present invention.

FIG. 4 is a view illustrating an installation state of the RFID tags in accordance with an embodiment of the present invention.

BEST MODE FOR CARRYING OUT THE INVENTION

The advantages, features and aspects of the invention will become apparent from the following description of the embodiments with reference to the accompanying drawings, which is set forth hereinafter. By this, the present invention will be easily carried out by those skilled in the art. Further, in the following description, well-known arts will not be described in detail if it seems that they could obscure the invention in unnecessary detail.

Hereinafter, preferred embodiments of the present invention will be set forth in detail with reference to the accompanying drawings.

FIG. 1 is a block diagram of an apparatus for providing position information and gathering information using Radio Frequency Identification (RFID) in accordance with an embodiment of the present invention.

As shown in FIG. 1, each vehicle is provided with an RFID reader 11 and a position information providing apparatus 12 for providing various services by processing RFID tag information acquired from the RFID reader 11 into position information. The position information providing apparatus 12 installed in a vehicle includes a database for storing position information corresponding to tag information in order to produce precise position information using the tag information acquired from the RFID tags, a position information determination unit for producing position information using the information stored in the database, and a service provider for providing a navigation service or other additional services using the position information determined by the position information determination unit. A more detailed structure of the RFID reader 11 installed in the vehicle will be described later with reference to FIGS. 2 and 3.

In the present invention, a plurality of RFID tags 13 are grouped in order to provide position information using the RFID tags 13 installed on each lane of a road. The RFID tags of the same group provide the same position information. A more detailed description thereof will be described later with reference to FIGS. 2 to 4.

A sensor node 14 is installed for each of RFID tag groups, and prepared so as to recognize the time point when the RFID tags 13 receives a radio signal from the RFID reader 11 and transmits stored RFID tag information and transmit the time information recognized along with a unique identifier of the sensor node to an information gathering server 15 over a sensor network.

The information gathering server 15 is able to process and provides information on the number of vehicles that passed at a specific time at the position of each sensor node and the intervals between vehicles by using the unique identifier of each sensor node provided from each sensor node and the time information.

An installation state of the RFID tags and a structure of the RFID reader will be described concretely with reference to FIGS. 2 to 4 for the convenience of description of the present invention.

FIG. 2 is a view illustrating an installation state of RFID tags and an RFID reader in accordance with an embodiment of the present invention. FIG. 3 is a view describing recognition areas of the RFID reader in accordance with an embodiment of the present invention. FIG. 4 is a view illustrating an installation state of the RFID tags in accordance with an embodiment of the present invention.

As shown in FIG. 2, in the present invention, a plurality of RFID tags are grouped and installed in order to minimize the transaction time of the RFID tags. And, one of the tag groups is installed at a specific position of each lane, and the other tag groups are consecutively installed at regular intervals on one lane.

For example, it is estimated that the average transaction time of general RFID tags is 38.8 msec due to delay time thereof, and the maximum transaction time thereof is 62 msec. By the way, in order to set an error range of position measurement within 1 m, the maximum acceptable communication distance between the RFID reader and the RFID tags should be within 1 m. Further, in case of a vehicle traveling at a high speed of 100 km/h, the time taken for the vehicle to pass 1 m is only 36 msec. Due to this, the transaction between the RFID reader and the RFID tags has to be finished within 36 msec. If the transaction is not finished within this time, the RFID reader may not be able to recognize RFID tag information.

Thus, in the present invention, in order to solve this problem, a number of RFID tags are grouped and installed on a lane at a specific point. At this time, if the number of RFID tags in one group is too large, a time load may occur due to collision between the RFID tags existing within the RFID tag group upon transaction with the RFID reader. Therefore, it is preferable that one group consists of three to four RFID tags.

Further, the RFID tags belonging to the same group store the same position information, and are installed at predetermined intervals. This is to prevent the phenomenon that the RFID reader of the vehicle may not be able to recognize RFID tag information due to the average transaction time.

Meanwhile, as shown in FIG. 2, the tag groups A and B are arranged at a predetermined distance apart from each other so that the vehicle traveling at a high speed does not recognize the two adjacent tag groups as the same group. For example, in case the interval between the tag groups A and B is 3 m, if the vehicle traveling at a high speed misrecognizes the group A and the group B as the same group, a position error of 3 m is generated. Thus, in the present invention, even when a vehicle travels at a high speed, the inter-group interval on the same lane is set to more than a predetermined distance (i.e., 5 m or more) to prevent the two groups from being recognized as one group.

Referring to FIG. 3, antennas of the RFID reader installed in a vehicle will be described.

In the present invention, a posture angle of RFID reader antennas is changed for the maximum front and rear recognition area, and the number of RFID reader antennas is changed for the maximum side recognition area. In the present invention, the posture angle between the RFID reader antennas and the road surface is changed in order to maximize the recognition area of the RFID reader antennas and at the same time minimize the position error. For example, as a result of changing the posture angle between the RFID reader antennas and the road surface and measuring the recognition area, it can be seen that the recognition area is the largest between 20 to 40 degrees, as shown in FIG. 3. Further, if it is assumed that the RFID reader antennas are installed at a 30 cm height, it can be found that the entire recognition area including the front and rear sides reaches 80 cm, and the position error is 70 cm or less.

FIG. 4 is a view describing an installation state of the RFID tags in accordance with an embodiment of the present invention.

As shown in FIG. 4, it is first assumed that two groups are installed on each lane of a road having four lanes. Each of the groups is installed at a predetermined distance, i.e., about 5 m, apart from each other Likewise, each of the groups is installed at a predetermined distance apart from the groups installed on an adjacent lane.

Each of the groups includes, as shown in FIG. 1, three RFID tags and one sensor node. A process of providing position information and gathering information in the present invention so configured will be described below.

First, when a vehicle having an RFID reader mounted therein passes a specific group A, at least one of three RFID tags belonging to the group A operates according to a frequency provided from the RFID reader to provide tag information to the RFID reader.

The sensor node 14 is connected to the three RFID tags, and senses, when at least one of the three RFID tags operates according to a frequency provided from the RFID reader, an operating signal, and transmits sensing information to the information gathering server 15 through the sensor network. At this time, the sensor node 14 transmits sensing data, such as its own node identifier (ID) and sensing time information, to the information gathering server 15 through the sensor network. The sensor node may configure a network along with the sensor nodes belonging to at least two groups to transmit sensing information.

Upon receipt of sensing information from each of the sensor nodes, the information gathering server 15 checks the position of each of the sensor nodes, and stores a history of times at which the sensing information is received from the corresponding sensor node. The information gathering server 15 is able to estimate the number of vehicles having passed for a predetermined time at a corresponding position and the passage time between vehicles by using the history of times thus stored for each sensor node, and predict the probability of collision between vehicles by using the estimated information.

The method of the present invention as described above may be implemented by a software program that is stored in a computer-readable storage medium such as CD-ROM, RAM, ROM, floppy disk, hard disk, optical magnetic disk, or the like. This process may be readily carried out by those skilled in the art, and therefore, details of thereof are omitted here.

The present application contains subject matter related to Korean patent applications No. 2006-0105869 and No. 2006-0124828 filed with the Korean Intellectual Property Office on Oct. 30, 2006, and Dec. 8, 2006, respectively, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

The invention claimed is:

1. An apparatus for generating and communicating road lane hazard data to a vehicle, comprising:
    a plurality of Radio Frequency Identification (RFID) tags installed at consecutive locations within a road lane, each of the plurality of RFID tags consecutively driven by a radio frequency transmitted from an RFID reader installed in the vehicle, wherein at least one RFID tag communicates stored tag information to the vehicle;
    a plurality of sensor nodes, wherein each sensor node is associated with a respective RFID tag of the plurality of RFID tags and senses a respective time point when the respective RFID tag is driven and transmits the sensed time point to a sensor network, wherein a plurality of sensed time points and respective RFID tag identifiers comprises traffic data; and
    an information gathering server that receives the transmitted traffic data.

2. The apparatus of claim 1, wherein the RFID reader has at least two antennas.

3. The apparatus of claim 2, wherein the at least two antennas of the RFID reader are installed to maintain an angle of 20 to 40 degrees with respect to the road.

4. The apparatus of claim 1, wherein the plurality of RFID tags includes groups of at least three RFID tags installed at each consecutive location.

5. The apparatus of claim 4, wherein a plurality of RFID tags belonging to a group store identical tag information.

6. The apparatus of claim 1, wherein the consecutive locations are at least 5 meters apart.

7. A method for communicating from a Radio Frequency Identification (RFID) tag to a vehicle on a road, comprising:
    driving a plurality of RFID tags consecutively located within a road lane;
    sensing respective driving time points for the plurality of driven RFID tags and transmitting sensing information, including the respective driving time points and RFID tag identifiers to an information gathering server; and
    c) storing and processing the sensing information gathered by the information gathering server through the sensor network.

8. The method of claim 7, further comprising:
    driving, at a single location, a group of at least three RFID tags having identical tag information; and
    sensing the driving time point from one of the RFID tags in the group.

9. The apparatus of claim 1, wherein the stored tag information includes the road lane hazard data.

10. The apparatus of claim 9, wherein the information gathering server determines a probability of a collision involving the vehicle, wherein the probability is based on a passage of time between vehicles within the road lane.

11. The apparatus of claim 10, wherein the road lane hazard data communicated by the RFID tag to the RFID reader within the vehicle includes lane change guidance for the vehicle.

12. The apparatus of claim 1 further comprising a position information providing apparatus, installed in the vehicle, that determines a prediction of a vehicle collision at a crossroad based on position information received from an RFID tag.

13. The method of claim 7, further comprising:

generating road lane hazard data based on the information; and communicating the road lane hazard data from one of the plurality of RFID tags to an RFID reader in a vehicle.

14. The method of claim 7 wherein the road lane hazard data is a probability of a collision with another vehicle.

* * * * *